United States Patent
Li et al.

(10) Patent No.: US 8,719,517 B2
(45) Date of Patent: May 6, 2014

(54) METHOD AND APPARATUS FOR EXECUTING A PROGRAM BY AN SPI INTERFACE MEMORY

(75) Inventors: Zhaoliang Li, Hangzhou (CN); Feifei Zhang, Beijing (CN); Boyun Qiu, Hangzhou (CN)

(73) Assignee: Hangzhou Synochip Technologies Co. Ltd, Hangzhou, Zhejiang Province (CN)

( * ) Notice: Subject to any disclaimer, the term of this patent is extended or adjusted under 35 U.S.C. 154(b) by 240 days.

(21) Appl. No.: 13/060,687

(22) PCT Filed: Feb. 25, 2010

(86) PCT No.: PCT/CN2010/070746
§ 371 (c)(1),
(2), (4) Date: Jun. 21, 2011

(87) PCT Pub. No.: WO2010/097043
PCT Pub. Date: Sep. 2, 2010

(65) Prior Publication Data
US 2011/0246708 A1     Oct. 6, 2011

(30) Foreign Application Priority Data
Feb. 27, 2009   (CN) .......................... 2009 1 0096232

(51) Int. Cl.
*G06F 12/00*         (2006.01)
(52) U.S. Cl.
USPC .......................................... 711/154; 711/103
(58) Field of Classification Search
USPC ....................................................... 711/103
See application file for complete search history.

(56) References Cited

U.S. PATENT DOCUMENTS

| | | | |
|---|---|---|---|
| 6,473,861 B1 * | 10/2002 | Stokes | 713/193 |
| 7,979,625 B2 * | 7/2011 | Le et al. | 711/103 |
| 2006/0224803 A1 | 10/2006 | Zinaty et al. | |
| 2009/0070516 A1 | 3/2009 | Hou | |

FOREIGN PATENT DOCUMENTS

| | | |
|---|---|---|
| CN | 1851682 A | 10/2006 |
| CN | 1975699 A | 6/2007 |

OTHER PUBLICATIONS

PCT International Search Report for PCT Counterpart Application No. PCT/CN2010/070746 containing Communication relating to the Results of the Partial International Search Report, 4 pgs., (May 27, 2010).
PCT Written Opinion of the International Searching Authority for PCT Counterpart Application No. PCT/CN2010/070746, and English Translation, 6 pgs., (May 27, 2010).

(Continued)

*Primary Examiner* — Reginald Bragdon
*Assistant Examiner* — Hannah A Faye-Joyner
(74) *Attorney, Agent, or Firm* — Blakely, Sokoloff, Taylor & Zafman LLP

(57) ABSTRACT

A multi-channel SPI interface memory controller disposed between a CPU and a multi-channel SPI interface memory is provided in the present invention. The multi-channel SPI interface memory controller comprises: a data path interface coupled to a bus of the CPU; a control path interface coupled to the bus of the CPU; a master controller coupled to the multi-channel SPI interface memory; a register bank disposed between the master controller and the control path interface, wherein the master controller is in signal coupling with the data path interface, and in signal coupling through the register bank with the control path interface. The inventive multi-channel SPI interface memory controller can support direct execution of a program on the SPI interface memory.

7 Claims, 6 Drawing Sheets

(56) References Cited

OTHER PUBLICATIONS

PCT International Preliminary Report on Patentability (Chapter I of the Patent Cooperation Treaty) for PCT Counterpart Application No. PCT/CN2010/070746, and English Translation, 8 pgs., (Aug. 30, 2011).

* cited by examiner

METHOD AND APPARATUS FOR EXECUTING A PROGRAM BY AN SPI INTERFACE MEMORY

CROSS-REFERENCE TO RELATED APPLICATIONS

This patent application is a U.S. National Phase application under 35 U.S.C. §371 of International Application No. PCT/CN2010/070746, filed Feb. 25, 2010, entitled METHOD AND DEVICE FOR SPI MEMORY TO RUN PROGRAM, which claims priority to Chinese patent application number 200910096232.0, filed Feb. 27, 2009.

FIELD OF THE INVENTION

The present disclosure is related to System On Chip ("SOC") Integrated Circuit design, and in particular to a method and apparatus for executing a program by a Serial Peripheral Interface ("SPI") interface memory.

BACKGROUND

A typical embedded application architecture usually comprises one master chip and more than one memory. The address bus and data bus of a parallel memory are designed separately, with tens of pins in total. Such a design has a relatively high data transmission rate. However, convenience and usability of application of the parallel memory are restricted due to the large number of pins and relatively high cost of interconnection, thus limiting its wide application in embedded systems such as an SOC single chip system.

With the evolution of techniques of memory that employs a serial SPI interface, the transmission rate of a mainstream serial memory has reached the order of 80 Mbps. Such a transmission rate is sufficient for low level data transmission applications. However, it is not sufficient if a program is to be directly run or data is to be transmitted with high speed on the serial memory. There have been some types of multi-channel SPI interface memories commercially available, such as the 4-channel SPI FLASH memory by Winbond Corporation, which is compatible with the previous single-channel SPI interface, uses the same 6-signal pins as the previous design, but supports 4 times of the previous transmission rate, i.e. up to 320 Mbps. A multi-channel serial memory has a higher transmission rate, which may meet the requirements for running programs and algorithms directly on the memory. The number of signal pins of such a serial SPI interface memory is six. Such low cost on pins makes the serial memory extremely convenient in application in an embedded system, reducing the design cost on the board level, and facilitating the wide use of such a serial memory in the field of embedded system and SOC single chip system.

However, an existing SPI interface memory is not capable of supporting directly program running thereon. When it is required for an embedded system or SOC single chip system to run a program kept on a serial memory, such a program in the memory, before it can be executed, has to be copied to a memory space such as SDRAM or SRAM which can run a program directly. Such an approach not only occupies valuable memory resources inside the embedded system or chip, but also limits the functionality of memory to saving data. It is highly desirable in the art for serial memory interface to run a program directly.

SUMMARY

In order to solve the problem of incapability of the existing multi-channel SPI interface memory to act as a carrier for program execution, the invention is intended to provide a method and apparatus for executing a program by a multi-channel SPI interface memory, and to construct, between a main processor central processing unit (CPU) and the multi-channel SPI interface memory, a complete mechanism for instructions and data interaction, as well as bus channels and control logics for executing such interaction, so that the CPU can not only perform fast data access operations on the multi-channel SPI interface memory, but also execute a program thereon, and conduct other necessary operation and control of the multi-channel SPI interface memory. Moreover, per the requirement of processing efficiency in actual use, and of compatibility with single channel devices, the invention shall, on basis of the employment of a multi-channel SPI interface memory solution, provide technical measures to be compatible with single channel SPI interface memory, and solutions for enhancing actual use efficiencies.

For the above purposes, a first aspect of the invention provides a method for controlling execution of a program by a multi-channel SPI interface memory, comprising the following steps:

1) generalizing, according to characteristics of operations that a processor CPU performs on a multi-channel SPI interface memory, such operations into 6 operating states, "busy", "instruction", "address", "dummy", "wait", and "data"; and arranging various operations for transitioning between/among these operating states as criteria for designing a state machine (control logic), in conjunction of a mechanism for controlling the multi-channel SPI interface memory;

2) quantizing operating conditions where the 6 operating states of step 1 are in, the operating conditions including:
   1_a channel mode that is employed, and
   2_an operating tempo needed by the various operating states;

3) setting up a control path and a data path separately, so as to separate data memory space operations and register space operations from each other when CPU is conducting information interaction with the multi-channel SPI interface memory;

4) configuring a read/write operation register for controlling the read or write of data from/to the multi-channel SPI interface memory, wherein the operating conditions specified in step 2 shall be contained in the read/write register;

5) configuring an instruction manipulation register, a write parameter register, and a read parameter register one by one, so as to operate on internal registers of the multi-channel SPI interface memory, including writing or reading internal parameters to/from the internal registers of the memory, wherein the ON and OFF of the write parameter register and the read parameter register are managed by the instruction manipulation register;

6) configuring a clock configuration register, for keeping parameters that match a CPU clock to a multi-channel SPI interface memory clock;

7) determining the state machine (control logic) according to the operating state transition diagram given in step 1 and the rules for different information interaction in different paths as determined in step 3, so as to facilitate the various operations for information interactions between the CPU and the multi-channel SPI interface memory to proceed in the specified path and according to the specified operating tempo;

8) configuring an instruction register for parsing CPU instructions;

1_if the CPU instruction accesses an internal memory space of the multi-channel SPI interface memory, then
   1/enable the data path so as to perform data read/write operation;
2_if the CPU instruction accesses a register space of the multi-channel SPI interface memory, then
   1/enable the control path so as to perform read/write operation on internal parameters.

In order to increase the efficiency of a massive data read/write operation of the multi-channel SPI interface memory, the method in step 1 as presented in the invention can be further improved by, in particular, further introducing an auxiliary "data" operating state to the 6 operating states and thus adding up to a total of 7 operating states. In the massive data read/write operation, the newly introduced auxiliary "data" state (denoted as "data_1") along with said "data" operating state in step 1 (denoted as "data_0") forms an alternating operation, and twenty-one operating procedures for improved operating states transitions are planned. Large amount of read/write data from the data path is in data interaction with the CPU and the memory simultaneously under control of the twenty-one operating states transitions, so that the transmission efficiency of massive data processing is enhanced.

The various registers in steps 4~6 may be specified as follows. The read/write operation register shares the same data-bit structure with the instruction register, wherein these data bits keep the following information, comprising: 1) path modes of the operating states, 2) operating tempos required by the various operating states, and 3) data-bit information such as multi-channel SPI interface memory instructions. The instruction operation register comprises the following data bits: 1) a data bit(s) for controlling the ON/OFF of the write parameter register, 2) a data bit(s) for controlling the ON/OFF of the read parameter register, and 3) other instruction operation related control flag bits such as a data bit for enabling an encrypt/decrypt module. The data bits of the write parameter register comprise: 1) data bits for parameter writing into the internal registers of the memory, and 2) address data bits for erasing internal data of the memory. The read parameter register shall have data bits for keeping read information of the internal parameters of the memory. The clock configuration register contains data bits for keeping information such as a frequency division factor, bypass, etc.

In order for implementation of the above described method for controlling the execution of a program by a multi-channel SPI interface memory, another aspect of the invention is to construct, between a main processor CPU and a multi-channel SPI interface memory, a hardware-based multi-channel SPI interface memory controller capable of the behavior mechanism of the above described method. Said multi-channel SPI interface memory controller comprises:

1) a data path interface, a control path interface, a master controller, a register bank, and a baud rate control logic, wherein the register bank comprises the various registers specified in the steps 4~6 of the described method of the invention;
2) a CPU bus coupled to the data path interface 21 and the control path interface 22, wherein the data path interface is coupled to the master controller via the data path and a data control line, wherein the control path interface is coupled to the register bank via the control path on one foot and to the master controller via an instruction control line 2 on the other foot, wherein the register bank is coupled to the master controller via a register bus on one foot and to the baud rate control logic via the data bus on the other foot; wherein the master controller is coupled to a clock line, and wherein a multi-channel SPI interface memory bus is led out for coupling with the multi-channel SPI interface memory.

Preferably, a 32-bit BVCI bus is utilized for the CPU bus, wherein the data path comprises a 24-bit address line and a 64-bit data line, wherein the control path comprises a 3 bit address line and a 32-bit data line, wherein the data control line and the instruction control line each comprises a 2-bit sync signal control line, wherein the register bus comprises a bus of five 32-bit sets, three sets of which comprising control buses for uni-directional transmission while the other two sets comprising data buses for bidirectional transmission, wherein the data bus comprises a 8-bit data line, and wherein the multi-channel SPI interface memory bus comprises a 6-bit SPI interface protocol bus.

In order to ensure information security of contents stored in the multi-channel SPI interface memory, an encrypt/decrypt module may be coupled in the data path, for encrypting data on the data path by the encrypt/decrypt module before the data is written to the multi-channel SPI interface memory, and for decrypting data read from the multi-channel SPI interface memory before the data is sent to the data path interface, wherein the register bank is coupled to the encrypt/decrypt module via an encrypt/decrypt control line for controlling the ON/OFF of the encrypt/decrypt module.

The master controller includes internally: a sync logic, a codec logic, an instruction enabling control module, a main state machine, a data reception module, an instruction/data sending module, and a data/address buffer. Further, the sync logic of the master controller is coupled externally to a data control line and an instruction control line, the codec logic of the master controller is coupled externally to the control bus in the register bus, and the data/address buffer of the master controller is coupled externally to the data path and to the data bus in the register bus. The internal operation modes and connections are as follow.

1) The instruction information from the register bus, after decoded by the codec logic, goes into the main state machine comprised of control logics via the control bus. The sync logic synchronizes the control signals from the data path interface or the control path interface, and sends them into the instruction enabling control module through the sync control bus, so as to cause the instruction enabling control module to send an instruction enabling signal to the main state machine through an enabling signal line at an appropriate time.
2) The data reception module is coupled to the main state machine and to the data/address buffer, respectively, and performs control feedback with the main state machine through the data reception control bus. The data reception module reads out the data or memory operation parameters in the SPI memory through the multi-channel SPI interface memory bus, placing the read data or memory operation parameters into the data/address buffer via the data reception bus, and then sending it to the CPU bus via the data path or via the data bus in the register bus and the control path.
3) The instruction/data sending module is coupled to the main state machine and the data/address buffer, and performs control feedback with the main state machine through an instruction/data sending control bus. The write data from the data path, or the memory operation parameters from the register bus are passed through the data/address buffer, and are written to the memory through the multi-channel SPI interface memory bus under the operation of the instruction/data sending module.

In order to increase massive data read and write efficiency of the multi-channel SPI interface memory, the master controller 24 can be further improved. In particular, an address predetermination logic may be introduced for monitoring the changes of address information on the data path and for making predetermination. When the next accessing address has a 4 byte increment on the current address, it can be determined as a continuous address. At this point, the address predetermination logic sends the predetermination information to the main state machine through a predetermination control line, so as to cause the main state machine to cease instruction and address transmission, and to control the data reception module or the instruction/data sending module to read or write data directly from/to the multi-channel SPI interface memory.

BENEFITS OF THE INVENTION

1. Similar functionality of executing a program directly as a parallel memory is achieved, while external pin resources are reduced dramatically, so that the multi-channel SPI interface memory is advantageous in terms of reduced silicon chip area and enhanced system reliability when integrated to the overall embedded architecture.
2. The compatibility with any of the instructions of various single-, dual-, and quad-channel SPI interface memory is achieved, so as to extend the multi-channel SPI interface memory from merely a data storage carrier to a program running carrier. An embedded system can have an application run directly on the memory with no need to boot by way of other storage media.
3. The reliance of the embedded system on SDRAM and on-chip RAM is reduced, so that the flexibility of the SOC system is increased, which facilitates the re-development and application of the embedded chip.
4. The programs or data in the memory is encrypted so as to protect the data, so that the security of the embedded products is enhanced.

DETAILED DESCRIPTION

Figure 1:
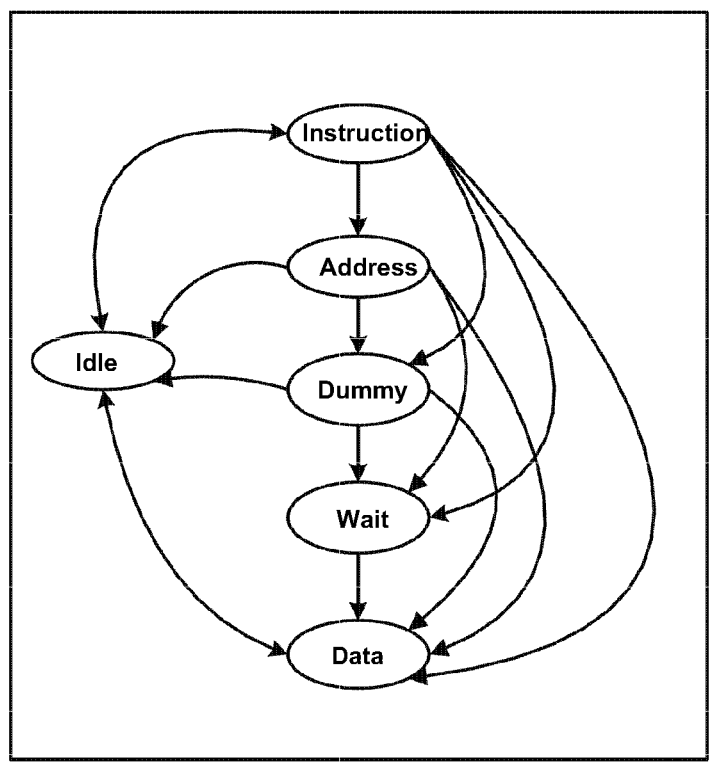
FIG. 1 is an operating state transition diagram of a multi-channel SPI interface memory.
Figure 2:
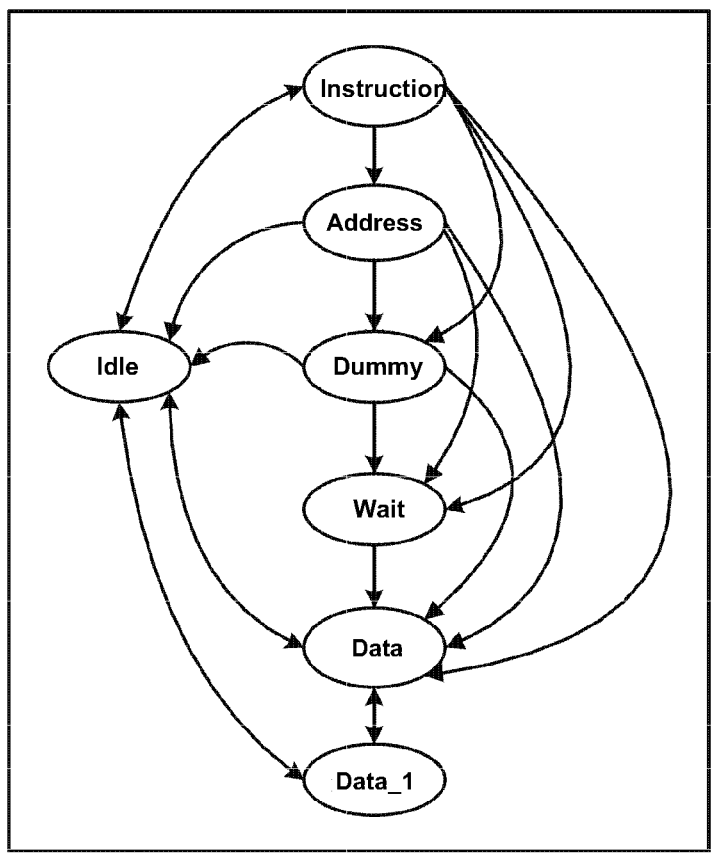
FIG. 2 is an operating state transition diagram of a preferred embodiment, wherein a new auxiliary data state is introduced.
Figure 3:
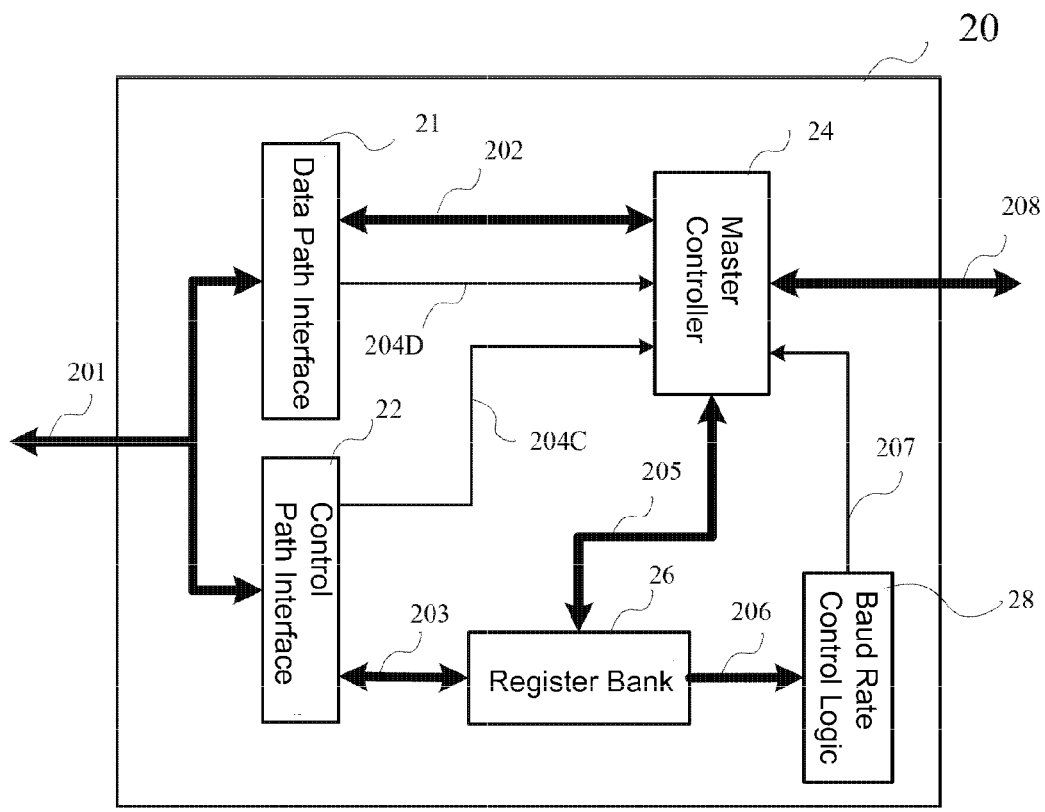
FIG. 3 is a block diagram illustrating internal modules and connections of a multi-channel SPI interface memory controller.

The invention is described in details below with reference to the figures and embodiments.
1. FIG. 1 illustrates operating states and transitions therebetween during operation of a multi-channel SPI interface memory of the invention. Based on analysis of practice, all operations can be encompassed by the 6 operating states and 17 transitions (one transition for a uni-directional arrow, and two transitions for a bidirectional arrow) as shown in the figure.
2. FIG. 2 illustrates further improvement to a method of the invention in a preferred embodiment for enhancing the efficiency of massive data read/write operation of the multi-channel SPI interface memory. An auxiliary "data" operating state is introduced, shown as "data_0" and "data_1" in the figure, while 21 transitions between these operating states are arranged. Massive read/write data from a data path can, under control of a main state machine as arranged in the figure, performs data interactions with the CPU and the SPI interface memory simultaneously, so as to enhance processing efficiency.
3. FIG. 3 is a multi-channel SPI interface memory controller 20 provided for implementation of a method for controlling a multi-channel SPI interface memory. The command interaction between the CPU and the multi-channel SPI interface memory is accomplished by hardware logics so as to have increased compatibility, and to support various existing mainstream memories. Such a controller is coupled between the main processor CPU and the multi-channel SPI interface memory, the controller comprising: a data path interface 21; a control path interface 22; a master controller 24; a register bank 26; as well as a baud rate control logic 28. A CPU bus 201 is coupled to the data path interface 21 and the control path interface 22 separately; the data path interface 21 is coupled to the master controller 24 via a data path 202 and a data control line 204D; the control path interface 22 is coupled to the register bank 26 via a control path 203 on one foot, and to the master controller 24 via an instruction control line 204C on the other foot; the register bank 26 is coupled to the master controller 24 via a register bus 205 on one foot, and to the baud rate control logic 28 via a data bus 206 on the other foot; the master controller 24 is coupled to a clock line 207, a multi-channel SPI interface memory bus 208 is led out from the master controller 24 for coupling with a multi-channel SPI interface memory. Hereinbelow, several aspects concerning the control path, the data path, the connecting buses, encrypt/decrypt control, and register configuration, etc. will be described in details.
1) The control path 203 is operative to set the register bank 26 in the multi-channel SPI interface memory controller, and to implement a path for other control operations on the multi-channel SPI interface memory. The registers of the multi-channel SPI interface memory controller may be configured by a program to send various SPI commands, such as erase, read/write internal registers of the memory, read ID, etc. Any instructions other than normal read/write access of the memory space of the memory can be sent via the control path.
2) The data path 202 is operative to enable the multi-channel SPI interface memory to be accessed as a parallel interface device. An accessing address is presented on the bus, and read/write operation can be conducted on the address. There is no difference except that the speed is not so high as the parallel interface device, since a parallel interface device has separate address bus and data bus and provides parallel transmissions, while at most 4 pins are used for transmission of address and data between a multi-channel SPI interface memory controller and a multi-channel SPI interface memory.
3) In a preferred embodiment of the invention, the CPU bus 201 comprises a 32-bit BVCI bus; the data path 202 comprises a 24-bit address line and a 64-bit data line; the control path 203 comprises a 3-bit address line and a 32-bit data line; the data control line 204D and the instruction control line 204C each comprises a 2-bit sync signal control line; the register bus 205 comprises a bus of five 32-bit sets, three sets of which comprising a control bus for uni-directional transmission while the other two sets comprising a data bus for bidirectional transmission; the data bus 206 comprises a 8-bit data line; and the multi-channel SPI interface memory bus 208 comprises a 6-bit SPI interface protocol bus.

4) An encryption algorithm is implemented by the hardware encrypt/decrypt module 23 for encrypting/decrypting the data or programs in the memory. The encryption protection for data can be controlled when the data is downloaded to the memory. Either all of the data, or only part of it may be encrypted, so as to effectively protect the data of the user. If encrypted data is to be read, then the inventive chip must be used and the particular position of the encryption must be known in order to decrypt properly. An encryption control register is used to control the enabling of an encryption algorithm to encrypt the memory data. The data is encrypted at the same time when it is written to the memory, and is decrypted at the same time when it is read out of the memory.

5) In a default state, no configuration is made to the register bank 26. The SPI interface memory can be treated simply as a RAM for reading data therefrom. The basic read operation command of most SPI interface memories is "03", therefore an initialization command of the present embodiment is "03". The CPU can read data directly from the SPI interface memory through the 32-bit bus, which means that a program on the memory can be run directly. The definitions of registers from the register bank are as follow.

| Name | Address Offset | Access Mode | Reset Value | Description |
|---|---|---|---|---|
| SPI_INST | 0X00 | W/R | 0X00000000 | SPI Instruction Register |
| SPI_INST_SET | 0X04 | W/R | 0X00000000 | SPI Instruction Operation Control Register |
| SPI_SPEC | 0X08 | W/R | 0X00000000 | SPI Write Parameter Register |
| SPI_CLKGEN | 0X0C | W/R | 0X00000000 | SPI Clock Configuration Register |
| SPI_DATA_ADDR | 0X10 | W/R | 0X00000000 | SPI Read Parameter Register |

-continued

| Name | Address Offset | Access Mode | Reset Value | Description |
|---|---|---|---|---|
| SPI_INST_READ | 0X14 | W/R | 0X03003000 | SPI Read/Operation Register |

The detailed contents of each of the registers are as follow.

SPI Instruction Register (SPI_INST), SPI Read/Write Operation Register (SPI_INST_READ)

| Name | Access | Reset Value | Content Category | Description |
|---|---|---|---|---|
| SPI_INST[1:0] | R/W | 0x0 | Inst Transmission Mode | 00: single 01: dual 10: quad |
| SPI_INST[3:2] | R/W | 0x0 | Address Transmission Mode | 00: single 01: dual 10: quad |
| SPI_INST[5:4] | R/W | 0x0 | Dummy Transmission Mode | 00: single 01: dual 10: quad |
| SPI_INST[7:6] | R/W | 0x0 | Wait Transmission Mode | 00: single 01: dual 10: quad |
| SPI_INST[9:8] | R/W | 0x0 | Data Transmission Mode | 00: single 01: dual 10: quad |
| SPI_INST[11:10] | | | | Reserved |
| SPI_INST[13:12] | R/W | 0x3 | Address number | 00: 0 Byte 01: 1 Byte 10: 2 Byte 11: 3 Byte |
| SPI_INST[15:14] | | | | Reserved |
| SPI_INST[18:16] | R/W | 0x0 | Dummy number | 000: 0 Byte 001: 1 Byte 010: 2 Byte 011: 3 Byte 100: 4 Byte 101: 5 Byte 110: 6 Byte 111: 7 Byte |
| SPI_INST[19] | | | | Reserved |
| SPI_INST[22:20] | R/W | 0x0 | Wait number | 000: 0 Byte 001: 1 Byte 010: 2 Byte 011: 3 Byte 100: 4 Byte 101: 5 Byte 110: 6 Byte 111: 7 Byte |
| SPI_INST[23] | R/W | 0x0 | Inst number | 0: 0 Byte 1: 1 Byte |
| SPI_INST[31:24] | R/W | 0x03 | | Inst Contents |

SPI Instruction Operation Control Register (SPI_INST_SET)

| Name | Access | Reset Value | Description |
|---|---|---|---|
| SPI_INST_SET[0] | R/W | 0x0 | Command_sending Flag (active high), automatically reset when instruction transmission completed. |
| SPI_INST_SET[3:1] | | | Reserved |
| SPI_INST_SET[4] | R/W | 0x0 | Spec_command_valid Flag (active high), automatically reset when instruction transmission completed. |
| SPI_INST_SET[7:5] | | | Reserved |
| SPI_INST_SET[8] | R/W | 0x0 | Control_path_data_transmission_valid Flag (active high), automatically reset when instruction transmission completed. |

-continued

| Name | Access | Reset Value | Description |
|---|---|---|---|
| SPI_INST_SET[11:9] | | | Reserved |
| SPI_INST_SET[12] | R/W | 0x0 | Data Read/Write Encryption Switch (high for encryption). Read can only be performed when encryption is enabled, if Write was performed with encryption enabled. |
| SPI_INST_SET[13] | R/W | 0x0 | It shall be placed at high when performing such command operations as Write operation and Read ID (those operations which need pulldown CS), and be reset manually when instruction transmission completed. |
| SPI_INST_SET[31:14] | | | Reserved |

SPI Write Parameter Register (SPI_SPEC)

| Name | Access | Reset Value | Description |
|---|---|---|---|
| SPI_INST_SET[23:0] | R/W | 0x0 | SPI Interface Memory Internal Configuration Register (for keeping values to be written into the memory, the internal register needs to be read from SPI_DATA_ADDR register). If there is an Erase command, then the 24-bit data is the address for the Erase command. If there is a Write Internal Register command, then SPI_INST_SET[23:16] is Register 1, and SPI_INST_SET[15:8] is Register 2. The order for sending the bytes is SPI_INST_SET[23:16], SPI_INST_SET[15:8], SPI_INST_SET[7:0] |
| SPI_INST_SET[31:24] | | | Reserved |

SPI Clock Configuration Register (SPI_CLKGEN)

| Name | Access | Reset Value | Description |
|---|---|---|---|
| SPI_INST_SET[7:0] | R/W | 0x0 | SPI Clock Frequency Division Factor |
| SPI_INST_SET[8] | R/W | 0x0 | SPI Clock bypass (low for bypass mode) |
| SPI_INST_SET[31:9] | | | Reserved |

SPI Read Parameter Register (SPI_DATA_ADDR)

| Name | Access | Reset Value | Description |
|---|---|---|---|
| SPI_INST_SET[7:0] | R/W | 0x0 | SPI Control Path Data Register, mainly for reading values of internal registers of the SPI interface memory and various Serial Number ID, etc., one byte each time. If there are multiple bytes in the ID contents, the address shall be visited continuously. |
| SPI_INST_SET[31:8] | | | Reserved |

6) With these registers, any command of existing SPI interface memory protocols can be configured. For example, in order to send a memory block erase command, firstly the SPI_INST register is configured to describe the content and format of the command, then the value of the SPI_SPEC is configured to be the address of the block to be erased, and finally the SPI_INST_SET is configured to enable the command. When the master controller receives the enabling command, a block erase command compliant to an SPI protocol will be sent.

7) Commands for reading/writing SPI interface memory data may be done automatically, while other commands need to be performed according to the above steps due to the characteristics of the SPI interface memory. The most significant features of the invention are the configurability of SPI protocol commands and the automatic performance of data read/write operation. Every time the BVCL bus issues a read/write request for the SPI interface memory space, the master controller will automatically detect it and send a command of SPI protocol to the memory, carrying out the interaction with the memory and then returning the data to the BVCI bus for fetching by the CPU, which greatly facilitating data operation on the memory. The user needs not to take care of the specific underlying SPI protocol in order to obtain access to the SPI interface memory space.

8) The registers can be configured with different SPI transmission baud rates, so that different applications can be fulfilled through the baud rate control logic 28. Using the highest SPI clock, they can be configured as fast as the system clock. The configuration of the clock can be done on-the-fly when the SPI interface memory runs a program.

Figure 4:
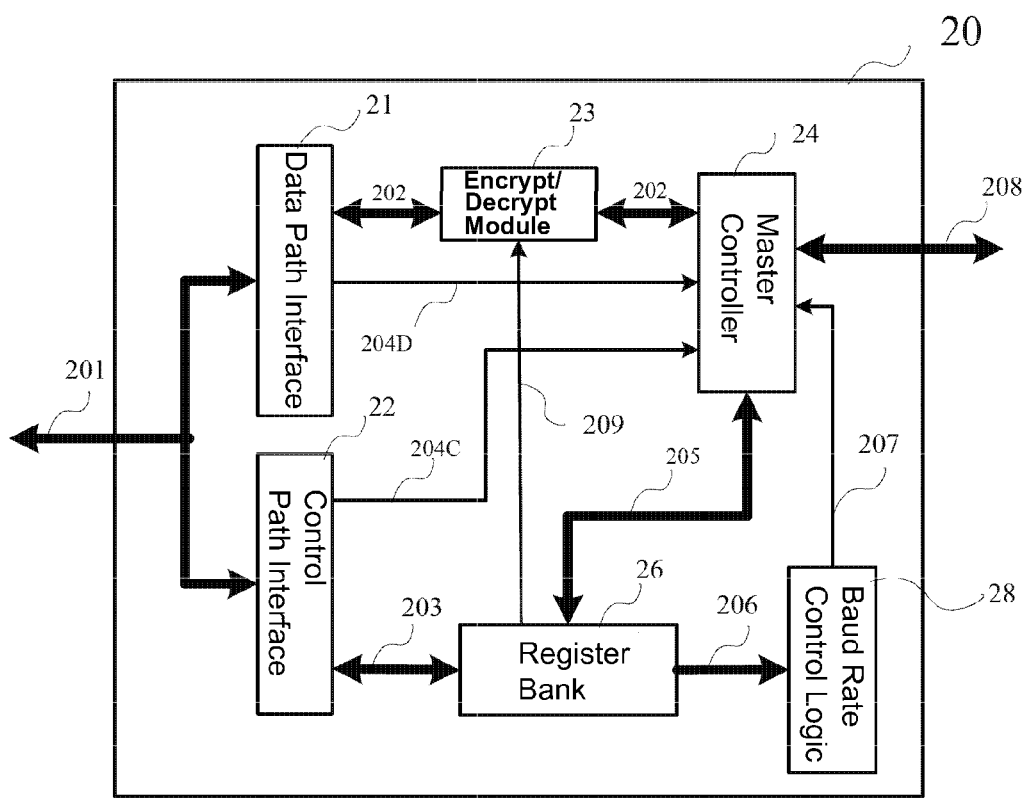
FIG. 4 is a block diagram illustrating connections in a multi-channel SPI interface memory controller of a preferred embodiment, wherein an encrypt/decrypt module is coupled between a data path interface and a master controller.

4. FIG. 4 illustrates an encrypt/decrypt module 23 coupled in the data path 202 in a preferred embodiment of the invention, for enhancing the security of data contents in the multi-access SPI interface memory. The encrypt/decrypt module is operative to: encrypt data on the data path 202 by the encrypt/decrypt module 23 before the data is written to the memory, and to decrypt encrypted data read from the memory before the data is sent to the data path interface 21.

The ON or OFF of the encrypt/decrypt module 23 is controlled by the register bank 26. After configuration of the register bank 26, the encrypt/decrypt module 23 can be enabled or disabled through an encrypt/decrypt control line 209 at any time.

Figure 5:
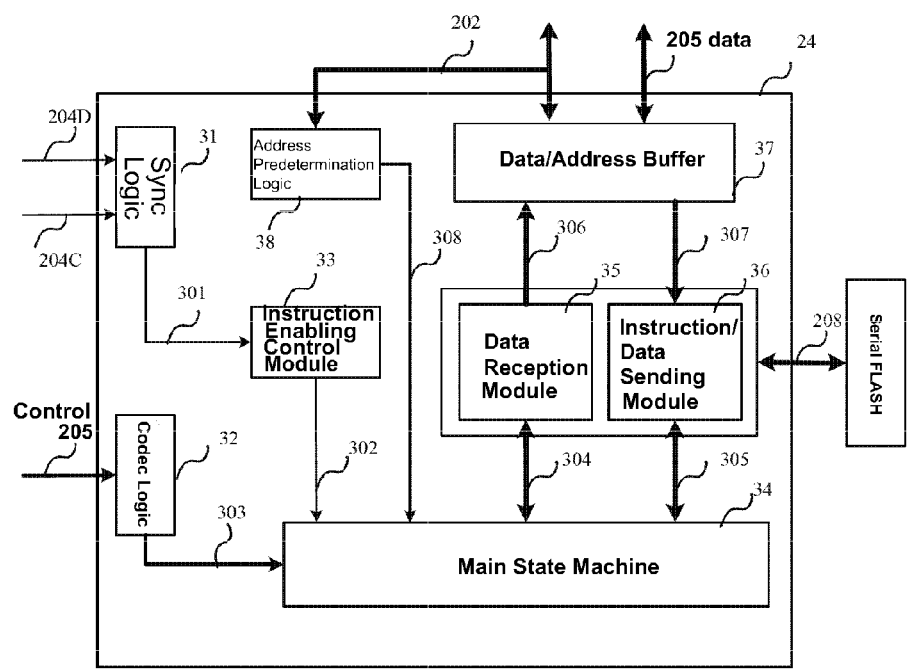
FIG. 5 is a block diagram illustrating internal construction and connections of a master controller.

5. FIG. 5 illustrates the internal construction and connections of the master controller. The master controller 24 comprises internally: a sync logic 31, a codec logic 32, an instruction enabling control module 33, a main state machine 34, a data reception module 35, an instruction/data sending module 36, and a data/address buffer 37. Further, the sync logic 31 of the master controller is coupled externally to a data control line 204D and an instruction control line 204C, the codec logic 32 of the master controller is coupled externally to the control bus in the register bus 205, the data/address buffer 37 of the master controller is coupled externally to the data path 202 and to the data bus in the register bus 205. The internal operation modes and connections are as follow.

1. The instruction information from the register bus 205, after decoded by the codec logic 32, goes into the main state machine 32 comprised of control logics via the control bus 303. The sync logic 31 operates to synchronize the control signals from the data path interface or the control path interface, and to send them into the instruction enabling control module 33 through the sync control bus 301, so as to cause the instruction enabling control module 33 to send an instruction enabling signal to the main state machine 34 through an enabling signal line 302 at an appropriate time.

2. The data reception module 35 is coupled to the main state machine 34 and to the data/address buffer 37, respectively, and performs control feedback with the main state machine through the data reception control bus 304, wherein the data reception module 35 reads out the data or memory operation parameters in the SPI memory through the multi-channel SPI interface memory bus 208, placing the read data or memory operation parameters into the data/address buffer 37 via the data reception bus 306, and then sending it to the CPU bus 201 via the data path 202 or via the data bus in the register bus 205 and the control path 203.

3. The instruction/data sending module 36 is coupled to the main state machine 34 and the data/address buffer 37 respectively, and performs control feedback with the main state machine through an instruction/data sending control bus 305, wherein the write data from the data path 202, or the memory operation parameters from the data bus in the register bus 205 are passed through the data/address buffer 37, and are written to the multi-channel SPI interface memory through the multi-channel SPI interface memory bus 208 under the operation of the instruction/data sending module 36.

The main state machine 34 is responsible for controlling the operating states of the serial transmission SPI protocol instructions. The SPI commands are categorized into an instruction phase (inst), an address phase (address), a dummy phase (dummy), a wait phase (wait), and a data phase (data) The main state machine controls the interaction of the instruction and data sending module and the data reception module with the memory through six SPI pins. The instruction enabling control module 33 enables the interaction with the SPI interface memory according to the requirements from the CPU. The codec module 32 decodes the values in the SPI_INST or SPI_INST_READ and imparts them to the main state machine so that it may send a corresponding command in a corresponding state. The sync logic 31 makes the control signals at the BVCI interface to operate across the clock domain at an SPI clock lower than the system clock. The instruction and data sending module 36 is responsible for sending instructions, addresses and data according to the SPI protocol. The data reception module 35 is responsible for receiving data from the SPI interface memory. The data/address buffer 37 is operative to temporarily keep data and address received or to be sent. The main state machine 34 is the control schedule center of the master controller 24, the operation mechanism of which is as follow.

1) The state transitions of the main state machine 34 are shown in FIG. 2. In the invention, the main state machine is designed, according to the characteristics of common SPI protocol instructions, as seven states, namely "idle" (state_idle), "instruction" (state_inst), "address" (state_addr), "dummy" (state_dummy), "wait" (state_wait), "data_0" (state_data0), and "data_1" (state_data1), for controlling the operations of the instruction/data sending module 36 and the data reception module 35, respectively. In each of the seven states, the main state machine 34 is in a different operating mode. For example, in "idle" state, the main state machine 34 does not work and is in a mode of waiting for command. In "instruction" state, the main state machine 34 enables the instruction/data sending mode 36 to send an instruction. In "address" mode, the main state machine 34 enables the instruction/data sending module 36 to send an address. In "dummy" state, the main state machine 34 sends all "zero" data. In "wait" state, the main state machine 34 only does counting job, during which any data received is ignored. In either "data_0" or "data_1" state, when sending data, the main state machine 34 enables the instruction/data sending module 36 to send the data, and when receiving data, the main state machine 34 enables the data reception module 35 to receive the data When an instruction enabling signal sent from the instruction enabling control module 33 is detected by the main state machine 34, the main state machine 34 transitions from the "idle" state to the "inst" state so as to perform instruction sending for one time. If, however, it is a data read/write transmission with continuous addresses, then the main state machine can jump from the "idle" state directly to either the "data_0" state or the "data_1" state so as to transmit data, and then when the transmission is completed, the main state machine may transition, according to the configuration of the register, to a next state or back to the "idle" state to wait for the CPU to initiate a next SPI instruction transmission. According to different SPI instructions to be sent, the user may configure the registers differently. The main state machine 34 may read the instruction register at the end of operation in the inst state. If the instruction comprises an address portion, then the main state machine 34 will jump to the "addr" state; otherwise if the instruction comprises no address portion, then the main state machine 34 will read the instruction register again to determine if there is a "dummy" portion. If so, the main state machine will jump from "inst" directly to "dummy" state; otherwise if not, then the main state machine 34 will read the instruction register again to determine whether there is a "wait" portion. And if so, the main state machine will jump from "inst" directly to "wait" state; otherwise if not, then the main state machine 34 will read the instruction register again to determine whether there is a "data0" portion. If so, the main state machine will jump from the "inst" directly to the "data0" state; otherwise if not, then the main state machine 34 will jump from the "inst" state directly to the "idle" state. In operating in any of the "addr" state, "dummy" state, and "wait" state, the main state machine 34 may perform state transitions according to the same way of determination as above. The purpose of introducing the "data0" and "data1" states is to enhance SPI transmission rate. Both the data buffer 0 and the data buffer 1 have 32 bits. Therefore, the data from the two buffers are alternatively sent or received for buffering, thus effectively eliminating the latency therebetween. And uninterrupted data transmission can be achieved.

2) The main state machine 34 is responsible for the operation of the controller at various times, controlling the instruction/data sending module 36 to send instructions of SPI protocol so as to interact with the SPI interface memory, while controlling the data reception module 35 to receive data from the SPI interface memory, wherein the data/address received or to be sent is kept in the buffer 37. The clock on the bus interface side is generally higher than the baud rate clock of the serial interface, therefore the control signal at the BVCI interface has to go through the sync logic 31 so as to be acquired by the master controller. The instruction enabling control module 33 is mainly responsible for initiating the transmission of an instruction of SPI protocol for one time. When the instruction operation control register SPI_INST_SET issues an enabling command, or if a read/write request is issued on the BVCI data path bus, the instruction enabling control module 33 will enable the main state machine into an instruction sending state in response. The codec logic 32 is mainly responsible for decoding the value in the SPI_INST or SPI_INST_READ and imparting it to the main state machine 34 so that it may send a corresponding command in a corresponding state.

3) When there is an access request for the SPI interface memory space on the bus, the SPI instruction sending module can be automatically activated so as to load the address on the bus to a command compliant to SPI specification for transmission. When the transmission of a present 32-bit data is finished, a feedback signal will be communicated to the bus. It is as convenient on the bus as to access a RAM, with no overhead on software and all accomplished by hardware. A program can indeed run on an SPI interface memory only when the data path operates completely the same as a RAM, because a program in execution will only keep on accessing new address space to acquire instructions, but cannot configure instructions compliant to SPI protocol on the fly. The user is even unaware of the fact that an SPI interface memory is accessed, since he needs only to wait for the data to return in addition to sending the accessing address, while does not have to pay any attention to the various complex SPI protocol commands of the memory.

4) BVCI bus is characterized in that the request and the response are operated separately. In the accessing of one address, the controller interacts with the memory to prepare the data after receiving a read request. In waiting for the data, the bus has sent a next read request. The controller will send a response to the bus when the data is ready. Only at this point will the controller receive the next request. When the controller is preparing the data, an address predetermination module may compare the current address with the address of the next request. If the two addresses is differenced by 4 (e.g. the addresses are 000004 and 000008, respectively), then they will be regarded as continuous burst accessing, and the main state machine will transition between "data0" and "data1", rather than return to "idle" to re-send a command address. In this way, the characteristic of SPI's capability of transmitting data with incremental addresses continuously is sufficiently exploited, in that the instruction and address need to be sent only once. In order to achieve uninterrupted data transmission, a data address predetermination module is introduced by the invention. In a preferred embodiment, an address predetermination logic 38 is introduced. The SPI protocol is characterized in ease of accessing continuous addresses, therefore one needs to send an initial address only once and then all data In this way, the transmission rate can be kept relatively high. When transmitting data by means of a serial controller, if a predetermination is made on the next accessing address on the bus, then continuous addresses will be taken for granted when the address has a 4 byte increment on the previous address. The controller will act accordingly so as to prevent the instruction sending module from re-sending the instruction and address, but rather to send or receive data directly. The purpose is to maximize the efficiency of data transmission of the SPI interface memory by avoiding interrupting the transmission and by using burst transmission as much as possible.

Figure 6:
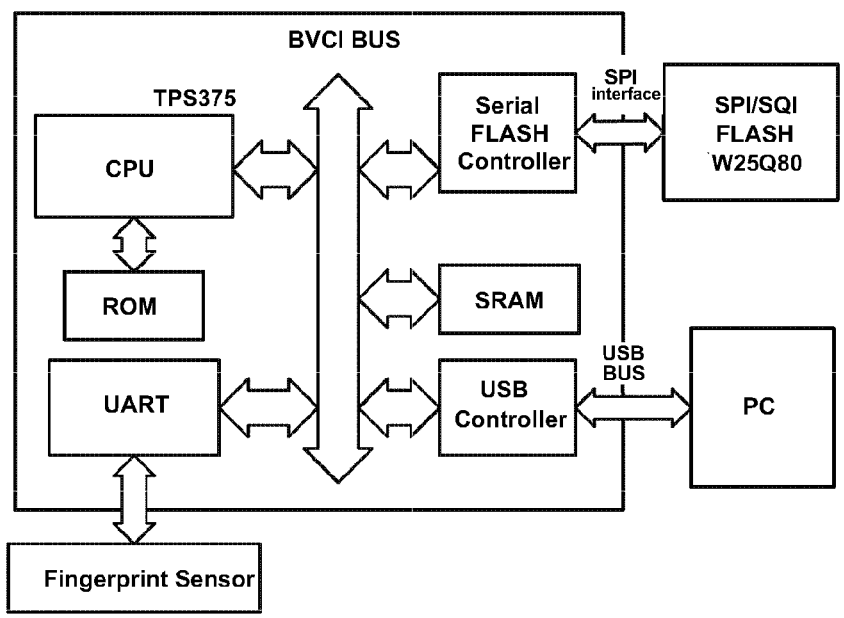
FIG. 6 is a block diagram illustrating integration of a solution of the invention into an SOC chip.

6. FIG. 6 is a block diagram illustrating the integration of a solution of the invention into a fingerprint identification SOC chip. TPS375 is a fingerprint identification SOP chip, wherein a multi-channel SPI interface control logic is integrated internally, and a 4-channel SPI interface FLASH, such as model W25Q80, a multi-channel SPI interface memory recently marketed by Winbond Corporation, is connected externally. The detailed implementing steps are as follow.

1) Firstly, a FLASH program is downloaded. In the ROM, a program is responsible for downloading an algorithm for fingerprint collection, splicing and comparison and a USB device driver to the FLASH through the multi-channel SPI interface controller. The FLASH is in a page operation mode, being capable of writing only one page (256 bytes) each time. Further, a write enabling command is required to be sent before each write operation, and the space is required to be erased into 1 before the writing. Moreover, after the writing, the FLASH register is required to be detected to determine if the writing is completed. The above inherent characteristics of the FLASH ask for a specific program to accomplish FLASH download.

2) When FLASH download is completed, the chip is powered off and re-started, and then jumps to the serial FLASH space to execute the program downloaded thereto. The program is firstly run according to a default single channel "03" instruction to fetch the instruction for execution, with the speed kept at 20M taking into consideration the necessity to be compatible with various manufacturers' support of SPI single-, dual-, and quad-channel FLASH. When the execution of the serial FLASH program comes to the configuration of a quick mode, the CPU configures the controller into a 4-channel mode of 320 Mbps. It is observed on the oscilloscope that the rates of the clock and data on the SPI pins increase significantly, and then the program in the serial FLASH runs according to the rate of 4-channel 320 Mbps all along.

3) The USB device driver and the fingerprint processing related program already exist in the FLASH. So that upon plugging the USB to the computer, some higher layer software on the PC may launch through the USB interface so as to find the fingerprint identification device. When the PC detects the USB device, the program for fingerprint collection is run in the FLASH, which is responsible for collecting images from an optical fingerprint sensor, and displaying them on the PC through the USB interface. Meanwhile, the fingerprint images may be saved into the data space in the serial FLASH. When a new fingerprint is collected by the fingerprint sensor, it may be compared to the fingerprint data in the FLASH. Feature extraction, comparison, search and other algorithms necessary for fingerprint processing are executed in the FLASH space.

4) The overall fingerprint identification program runs well on the serial FLASH, with the whole program of about 100 kilobytes. Further, the TPS375 chip has a 8K cache space. A lot of repetitiously cycled programs need to be read only once, so that the execution efficiency improves significantly. Therefore, the effect of executing a program on the multi-channel SPI interface FLASH with the cache enabled approaches that of a parallel memory.

What is claimed is:

1. A multi-channel SPI interface memory controller, disposed between a central processing unit (CPU) and a multi-channel serial peripheral interface (SPI) interface memory, comprising:
 a data path interface coupled to a bus of the CPU;
 a control path interface coupled to the bus of the CPU;
 a master controller coupled to the multi-channel SPI interface memory; and
 a register bank disposed between the master controller and the control path interface,
 wherein the master controller is in signal coupling with the data path interface, and in signal coupling through the register bank with the control path interface,
 wherein the master controller comprises a main state machine, wherein the main state machine has six logical states: idle, instruction, address, dummy, wait, and data, wherein the master controller controls the main state machine to transition to one of the six logical states after parsing an instruction in the register bank.

2. The multi-channel SPI interface memory controller of claim 1, wherein the state machine further has a seventh state: data_1 state, wherein when a massive data read/write operation is conducted by the multi-channel SPI interface memory controller, the state machine transitions between the data state and the data_1 state alternatively until the massive data read/write operation completes.

3. The multi-channel SPI interface memory controller of claim 1, wherein an encrypt/decrypt module is disposed between the data path interface and the master controller, for encrypting data to be written into the multi-channel SPI interface memory and for decrypting data read from the multi-channel SPI interface memory.

4. The multi-channel SPI interface memory controller of claim 3, wherein the register bank is coupled to the encrypt/decrypt module for controlling the ON or OFF of the encrypt/decrypt module.

5. The multi-channel SPI interface memory controller of claim 1, wherein the master controller further comprises: a data/address buffer, a data reception module, an instruction/data sending module, and a codec logic,
 wherein instruction information from the register bank goes into the main state machine after decoding by the codec logic,
 wherein the data reception module performs control feedback to the main state machine, and is coupled to the SPI interface memory so as to store data or memory operation parameters read from the SPI interface memory into the data/address buffer, and to send the data or memory operation parameters from the data/address buffer to the CPU; and
 wherein the instruction/data sending module performs control feedback to the main state machine, and writes write data from the data path interface or the memory operation parameters from the register bank into the multi-channel SPI interface memory through the data/address buffer.

6. A method for controlling a multi-channel serial peripheral interface (SPI) interface memory controller, the multi-channel SPI interface memory controller being disposed between a central processing unit (CPU) and a multi-channel SPI interface memory and comprising a master controller coupled to the multi-channel SPI interface memory, the master controller comprising a main state machine, wherein the method comprises:
 providing a data path and a control path between the CPU and the multi-channel SPI interface memory controller, respectively,
 wherein the main state machine is provided with six logical states: idle, instruction, address, dummy, wait, and data, wherein the master controller controls the main state machine to transition to one of the six logical states according to a received instruction.

7. The method of claim 6, wherein the state machine is further provided with a seventh state: data_1 state, wherein when a massive data read/write operation is conducted by the multi-channel SPI interface memory controller, the state machine is transitioned between the data state and the data_1 state alternatively until the massive data read/write operation completes.

* * * * *